US011240496B2

(12) United States Patent
Stepin et al.

(10) Patent No.: US 11,240,496 B2
(45) Date of Patent: Feb. 1, 2022

(54) LOW COMPLEXITY MIXED DOMAIN COLLABORATIVE IN-LOOP FILTER FOR LOSSY VIDEO CODING (71) Applicant: Huawei Technologies Co., Ltd., Shenzhen (CN)

(72) Inventors: Victor Alexeevich Stepin, Moscow (RU); Roman Igorevich Chernyak, Moscow (RU); Ruslan Faritovich Mullakhmetov, Moscow (RU)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/422,428

(22) Filed: May 24, 2019

(65) Prior Publication Data
US 2019/0394464 A1 Dec. 26, 2019

Related U.S. Application Data (63) Continuation of application No. PCT/RU2016/000920, filed on Dec. 23, 2016.

(51) Int. Cl.
*H04N 19/117* (2014.01)
*H04N 19/124* (2014.01)
(Continued)

(52) U.S. Cl.
CPC ......... *H04N 19/117* (2014.11); *H04N 19/124* (2014.11); *H04N 19/154* (2014.11);
(Continued)

(58) Field of Classification Search
CPC .................................................. H04N 19/117
See application file for complete search history.

(56) References Cited

U.S. PATENT DOCUMENTS 8,139,883 B2 * 3/2012 Zhang ..................... G06T 5/002
348/607
9,137,547 B2 * 9/2015 Van der Auwera .... H04N 19/70
(Continued)

FOREIGN PATENT DOCUMENTS

CN   102292990 A   12/2011
CN   104350752 A   2/2015
(Continued)

OTHER PUBLICATIONS

Maggioni et al., "Video Denoising, Deblocking, and Enhancement Through Separable 4-D Nonlocal Spatiotemporal Transforms," IEEE Transactions on Image Processing, vol. 21, No. 9, pp. 3952-3966, XP011492148, Institute of Electrical and Electronics Engineers—New York, New York (Sep. 2012).
(Continued)

*Primary Examiner* — Chikaodili E Anyikire
(74) *Attorney, Agent, or Firm* — Leydig, Voit & Mayer, Ltd.

(57) ABSTRACT

A video coding apparatus is described for encoding or decoding a frame of a video, the video coding apparatus comprising a computer program code and a processor configured to carry out operations on the frame of video. The operations include reconstructing the frame, and determining one or more filter parameters and filtering in a frequency domain and a pixel domain a block of the reconstructed frame based on the determined filter parameters to obtain a filtered block of the frame. The determining the one or more filter parameters and filtering in a frequency domain based on the determined filter parameters is performed jointly within a loop, and the one or more filter parameters are based
(Continued)

on one or more first parameters that are based on the reconstructed frame and one or more second parameters which are based on a codec signaling information.

16 Claims, 10 Drawing Sheets

(51) Int. Cl.
    *H04N 19/154*     (2014.01)
    *H04N 19/176*     (2014.01)
    *H04N 19/50*     (2014.01)
    *H04N 19/61*     (2014.01)
    *H04N 19/82*     (2014.01)

(52) U.S. Cl.
    CPC ........... *H04N 19/176* (2014.11); *H04N 19/50* (2014.11); *H04N 19/61* (2014.11); *H04N 19/82* (2014.11)

(56) References Cited

U.S. PATENT DOCUMENTS

| | | | | |
|---|---|---|---|---|
| 9,681,132 | B2* | 6/2017 | Chen | H04N 19/51 |
| 9,712,846 | B2* | 7/2017 | Narroschke | H04N 19/147 |
| 2009/0067642 | A1* | 3/2009 | Buck | H04R 3/005 |
| | | | | 381/94.1 |
| 2009/0304085 | A1* | 12/2009 | Avadhanam | H04N 19/117 |
| | | | | 375/240.24 |
| 2010/0074330 | A1* | 3/2010 | Fu | H04N 19/147 |
| | | | | 375/240.12 |
| 2010/0158103 | A1* | 6/2010 | Ye | H04N 19/176 |
| | | | | 375/240.02 |
| 2011/0222597 | A1 | 9/2011 | Xu et al. | |
| 2011/0268366 | A1* | 11/2011 | Daian | H04N 19/197 |
| | | | | 382/232 |
| 2011/0274158 | A1 | 11/2011 | Fu et al. | |
| 2011/0292998 | A1* | 12/2011 | Ohgose | H04N 19/176 |
| | | | | 375/240.08 |
| 2012/0177104 | A1 | 7/2012 | Budagavi et al. | |
| 2012/0288213 | A1 | 11/2012 | Amon et al. | |
| 2013/0003871 | A1 | 1/2013 | Bjontegaard et al. | |
| 2013/0094569 | A1 | 4/2013 | Chong et al. | |
| 2013/0182765 | A1 | 7/2013 | Gao et al. | |
| 2014/0219348 | A1 | 8/2014 | Kobayashi | |
| 2014/0269913 | A1* | 9/2014 | Lee | H04N 19/197 |
| | | | | 375/240.12 |
| 2019/0394464 | A1* | 12/2019 | Stepin | H04N 19/82 |

FOREIGN PATENT DOCUMENTS

| | | |
|---|---|---|
| EP | 1841230 A1 | 10/2007 |
| EP | 2375747 A1 | 10/2011 |
| WO | 2013155084 A1 | 10/2013 |

OTHER PUBLICATIONS

Dabov et al., "Image Denoising by Sparse 3-D Transform-Domain Collaborative Filtering," IEEE Transactions on Image Processing, vol. 16, No. 8, pp. 2080-2095, XP011485829, Institute of Electrical and Electronics Engineers—New York, New York (Aug. 2007).

Zhang et al., "Transform-Domain In-Loop Filter with Block Similarity for HEVC," VCIP 2016, Chengdu, China, pp. 1-4, XP055405520, Institute of Electrical and Electronics Engineers—New York, New York (Nov. 27-30, 2016).

Zhang et al., "Image postprocessing by Nonlocal Kuans filter," Journal of Visual Communication and Image, pp. 251-262, XP028172660, Deprartment of Electranic Engineering, The Chinese University of Hong Kong (Apr. 2011).

Dabov et al., "Video Denoising by Sparse 3D Transform-Domain Collaborative Filtering," 15th European Signal Processing Conference (EUSIPCO 2007), Poznan, Poland, pp. 145-149, XP032772966 (Sep. 3-7, 2007).

Zhang et al., "Video Compression Artifact Reduction via Spatio-Temporal Multi-Hypothesis Prediction," IEEE Transactions on Image Processing, vol. 24, No. 12, , pp. 6048-6061, XP011589709, Institute of Electrical and Electronics Engineers—New York, New York (Dec. 2015).

Chen et al., "Classified Quadtree-based Adaptive Loop Filter," 2011 IEEE International Conference on Multimedia anti Expo, pp. 1-6, Institute of Electrical and Electronics Engineers—New York, New York (2011).

Chen et al., "Coding tools investigation for next generation video coding based on HEVC," Proc. of SPIE vol. 9599, pp.1-10, ResearchGate (Sep. 2015).

"Series H: Audiovisual and Multimedia Systems Infrastructure of audiovisual services—Coding of moving video, Advanced video coding for generic audiovisual services," ITU-T H.264, pp. 1-804, International Union of Telecommunication—Geneva, Switzerland (Oct. 2016).

"Series H: Audiovisual and Multimedia Systems Infrastructure of audiovisual services—Coding of moving video, High efficiency video coding," ITU-T H.265, pp. 1-634, International Union of Telecommunication—Geneva, Switzerland (Apr. 2015).

* cited by examiner

Partitioning $B = \{b_1, b_2, ..., b_M\} = CreatePartitions(S, n)$

For each $b_i$ in $B$

If Classifier->isNonFlatRegion()

{

Block matching $P_i = BlockMatch(S, b_i)$ (non local filtering)

Joint frequency domain filtering and parameters estimation

$\tilde{P}_i = ParamsEstAndFreqWienerFiltering(P_i, N)$     }

Else

{

$P_i = \{b_i\}$ ( local filtering )

$\tilde{P}_i = PixelFlt(P_i)$ pixel domain filtering     }

Pixel domain collaborative filtering $O = SameBlockAvg(\tilde{P}_1, \tilde{P}_2, ..., \tilde{P}_M)$

Stack transform for each patch group

$$TF_i = LowCompStackTransform(P_i) = (tf_i^0, tf_i^1, \ldots, tf_i^{s^2})^T$$

For each $tf_i^j$ in $TF_i$

For each $w$ in $tf_i^j$

If( $tf_i^j(w)$ <threshold)

Filter parameters estimation

$$g_i^j(w) = 0$$

Wiener frequency domain filtration

$$tf_i^j(w) = g_i^j(w) \bullet tf_i^j(w) = 0$$

Else

Filter parameters estimation

$$g_i^j(w) = \frac{(tf_i^j(w))^2}{(tf_i^j(w))^2 + N^2}$$

Wiener frequency domain filtration

$$tf_i^j(w) = g_i^j(w) \bullet tf_i^j(w)$$

end

LOW COMPLEXITY MIXED DOMAIN COLLABORATIVE IN-LOOP FILTER FOR LOSSY VIDEO CODING

CROSS-REFERENCE TO RELATED APPLICATIONS

This application is a continuation of International Application No. PCT/RU2016/000920, filed on Dec. 23, 2016, the disclosure of which is hereby incorporated by reference in its entirety.

TECHNICAL FIELD

The present invention relates to a video coding apparatus, a system comprising a video encoding apparatus and a video decoding apparatus and a method for encoding and/or decoding a frame of a video. The present invention also relates to a computer-readable storage medium storing program code, the program code comprising instructions for carrying out such a method.

BACKGROUND

Many recent video compression techniques are used by hybrid video codecs such as H.264/AVC and H.265/HEVC. Powerful video compression tools include in-loop filtering (for improving prediction, that is, inter-prediction or intra-prediction) and post filtering for improving the decoded video.

In a hybrid video codec, a reconstructed (decoded) image is used for predicting next frames. Quantization noise in the decoded image makes the prediction worse. Noise of the input sensor (e.g., noise of the image sensor in a video camera) also can deteriorate the prediction. Different in-loop filters can decrease these kinds of noise jointly or independently.

A decoder can comprise an in-loop filter similar to the in-loop filter of the encoder. The in-loop filter of the decoder improves the prediction signal. The post filter improves the decoded image. In many decoders, a single filter is used as post filter and as in-loop filter. Despite the advances in the prior art, there is still a need for an improved method of filtering the reconstructed signal for improving the prediction signal on the encoder/decoder sides and for improving the decoded video for an end user.

The most familiar in-loop filter is the Adaptive Loop Filter. This filter was proposed on a MPEG standardization meeting for use in the Next Generation Video codec. According to this method each reconstructed frame is divided into set of small macroblocks (super-pixels) and then each macroblock is filtered by the adaptive filter.

An Adaptive Loop Filter comprises three blocks: a parameter estimation block, a pixel domain filtering block and an application map block. In the encoder, a parameter estimation block estimates a 2D pixel domain Wiener filter impulse response for each macroblock based on matching between original and filtered reconstructed images. Then these impulse responses are quantized and transferred to the entropy encoder. The entropy encoder inserts encoded filter parameters into the output bitstream. The output bitstream is transferred from the encoder to the decoder. In the decoder, the entropy decoder recovers the Wiener filter impulse response for each macroblock and transfers filter parameters to the pixel domain filtering block for use in the filtering process. In the decoder and the encoder, the respective pixel domain filtering block performs pixel domain filtering of the reconstructed image according to filter parameters from the parameter estimation block. In the encoder, only the prediction signal is filtered. On the decoder side filtered frames are used for joint prediction frame improvement (in-loop filtering) and decoded frame improvement (post filtering) for the end user. Filtering can be applied not only for the full reconstructed frame but also for parts of an image.

Shortly, an Adaptive Loop Filter can have the following base features:
  Filters Impulse response is derived based on original and filtered reconstructed images matching
  Filter parameters are transferred from encoder to decoder side
  Filtering is performed in the pixel domain
  Filter is applied as in-loop (prediction improvement) and post (decoded picture improvement) filter
  Application map is build based on RDO process
  Quantization noise is filtering only Despite many advantageous properties of the Adaptive Loop Filter, there is still a need for an improved video coding method and an improved apparatus for video coding.

SUMMARY OF THE INVENTION

The objective of the present invention is to provide a video coding apparatus, a system comprising a video encoding apparatus and a video decoding apparatus and a method for decoding and/or encoding a video, wherein the video coding apparatus, the system and the method overcome one or more of the problems of the prior art.

A first aspect of the invention provides a video coding apparatus for encoding or decoding a frame of a video, the video coding apparatus comprising:
  a frame reconstruction unit configured to reconstruct the frame, and
  a joint parameter determination and filtering unit configured to determine one or more filter parameters and to filter in a frequency domain and a pixel domain a block of the reconstructed frame based on the determined filter parameters to obtain a filtered block of the frame, wherein determining the one or more filter parameters and filtering in a frequency domain based on the determined filter parameters is performed jointly within a loop, and wherein the one or more filter parameters are based on one or more first parameters which are based on the reconstructed frame and one or more second parameters which are based on codec signaling information.

Jointly determining the filter parameters and performing the filtering based on the determined filtering parameters can be done, e.g., by determining the filter parameters and applying them to the reconstructed frame within one loop.

The video coding apparatus can be an encoder or a decoder. It is understood that the video coding apparatus does not necessarily filter each frame completely. In embodiments, only one or more blocks of are filtered. For example, some blocks may be filtered and encoded using the joint parameter determination and filtering unit and other blocks may be filtered and encoded using a different filtering unit.

The video coding apparatus of the first aspect has the advantage that the filter parameters can be derived on the decoder-side and do not need to be encoded into the bitstream. Thus an improved coding efficiency can be achieved.

Preferably, the joint parameter determination and filtering unit is configured to determine the one or more filter parameters based only on the reconstructed frame and not on the original frame on the encoder side. Thus the joint parameter determination and filtering unit does not require the original frame. The parameters can therefore be determined in the same manner based on the reconstructed frame, both at the encoder side and at the decoder side (where the original frame is not available).

In a first implementation of the video coding apparatus according to the first aspect, the apparatus further comprises:
- a pixel domain filtering unit configured to filter a block of the frame in pixel domain and
- a classifier configured to determine for the block of the frame whether to filter the block using the joint parameter determination and filtering unit or using the pixel domain filtering unit.

Thus, the video coding apparatus of the first implementation can be configured to filter the block both in pixel domain and in frequency domain. Filtering in frequency domain can be performed jointly with the determining of the parameters (e.g. within the same loop), wherein filtering in the pixel domain can be performed separately (e.g. outside the loop). Performing the filtering in pixel domain and frequency domain can lead to improved results.

In a second implementation of the video coding apparatus according to the first aspect as such or according to the first implementation of the first aspect, the classifier is configured to determine to filter the block using the joint parameter determination and filtering unit based on:
- a smoothness measure being lower than a threshold, and/or
- a luma variance being lower than a threshold.

Experiments have shown that smoothness measures and/or luma variance are good predictors for whether filtering with the joint parameter determination and filtering unit will yield an improved result or not.

The thresholds can be predetermined thresholds or in other embodiments the thresholds can be adaptively determined based on properties of the video and/or the current frame of the video, e.g. based on the currently reconstructed frame.

In a third implementation of the video coding apparatus according to the first aspect as such or according to any of the preceding implementations of the first aspect, the video coding apparatus is an encoder and further comprises an application map unit configured to determine, for a joint-filtering block for which the classifier has determined to filter using the joint parameter determination and filtering unit, whether to skip the filtering.

In other words, the classifier determines whether to apply frequency or pixel domain filtering (if any), and the application map determines whether frequency domain filtering should indeed be applied.

Preferably, the application map unit determines to skip filtering based on a weighted function of a prediction improvement and an output video degradation. The prediction improvement can be e.g. due to sensor and quantization noise suppression. On the other hand, sensor noise suppression and edge distortion can cause a degradation of the (perceived) quality of the output video Preferably, the encoder is configured to encode corresponding signaling information about the application map in the bitstream and thus communicate the information to a decoder.

In a fourth implementation of the video coding apparatus according to the first aspect as such or according to any of the preceding implementations of the first aspect, a plurality of reconstructed frames are stored in a decoded picture buffer and the joint parameter determination and filtering unit is configured to determine the one or more first parameters based on one or more frames of the decoded picture buffer.

In a fifth implementation of the video coding apparatus according to the first aspect as such or according to any of the preceding implementations of the first aspect, the joint parameter determination and filtering unit is configured to estimate the original frame from the reconstructed frame and determine the first parameters based on the estimated original frame.

Estimating the original frame allows roughly removing sensor and/or quantization noise and better estimating parameters of the original frame. Thus, an improved determination of the first parameters can be performed based on the estimated original frame compared to deter-mining the first parameters based on the reconstructed frame.

In a sixth implementation of the video coding apparatus according to the first aspect as such or according to any of the preceding implementations of the first aspect, joint parameter determination and filtering unit is configured to determine a quantization noise value from the codec signaling information and determine the second parameters based on the derived quantization noise value.

This has the advantage that the filter parameters can be determined with higher accuracy.

Preferably, the quantization noise value can be derived analytically from the codec signaling information.

Preferably, the joint parameter determination and filtering unit is configured to analytically derive the quantization noise value from a quantization parameter QP of the codec signaling information.

In a seventh implementation of the video coding apparatus according to the first aspect as such or according to any of the preceding implementations of the first aspect, the joint parameter determination and filtering unit is configured to determine the filter parameters and to filter the reconstructed frame based on the determined filter parameters by:
- determining a plurality of blocks of the reconstructed frame, and
- for each of the blocks:
  - determining a cluster of pixel-domain patches that are similar to the block,
  - determining the first parameters based on the cluster of pixel-domain patches,
  - determining the second parameters based on signaling information of the block,
  - performing collaborative filtering of the cluster of pixel-domain patches in frequency domain to obtain a cluster of filtered pixel-domain patches, and
  - performing collaborative filtering of the filtered pixel-domain patches in pixel domain along pixel-domain patches with same spatial coordinates from different clusters.

Preferably, the method further comprises that for each block the second parameter are derived from block-specific encoder signaling information.

Preferably, the plurality of blocks is a partitioning of the original frame, i.e., they cover the entire frame. In other embodiments, the plurality of blocks does not cover the entire frame.

Preferably, the plurality of blocks of the reconstructed frame covers the entire reconstructed frame. The blocks can represent a segmentation of the reconstructed frame (i.e., they are non-overlapping) or they can cover the reconstructed frame in an overlapping manner.

In an eighth implementation of the video coding apparatus according to the first aspect as such or according to any of the preceding implementations of the first aspect, the joint parameter determination and filtering unit is configured to determine, for each of the plurality of blocks, the filter parameters based on the pixel patches by:

regrouping elements of the pixels patches to obtain a matrix $T_i$, wherein each row of the matrix $T_i$ comprises pixels with same spatial coordinates from different patches in one cluster, transforming the matrix $T_i$ to obtain a transformed matrix t wherein each row of the matrix $tf_{vw}^i$ is a 1D transform of a corresponding row of matrix $T_i$, and determining the filter parameters $g_{v,w}^i$ as:

$$g_{vw}^i(\Omega) = \frac{(tf_{vw}^i(\Omega))^2}{(tf_{vw}^i(\Omega))^2 + N^2}$$

wherein $\Omega$ is a column number in matrix $tf_{vw}^i$, spatial coordinates v, w correspond to a j-th row of matrix $tf_{vw}^i$, and N is a quantization noise value derived from the codec signaling information.

Preferably, the filter parameters $g_{v,w}^i$ are set to zero if $(tf_{vw}^i)^2$ is less than a predetermined threshold.

In a ninth implementation of the video coding apparatus according to the first aspect as such or according to any of the preceding implementations of the first aspect, the joint parameter determination and filtering unit is configured to performing filtering by multiplying each element of matrix $tf_{vw}^i$ by a filter parameter $g(\Omega)_{vw}^i$, wherein $\Omega$ is a column number in matrix $tf_{vw}^i$ and spatial coordinates v, w in each patch correspond to a j-th row of matrix $tf_{vw}^i$.

In a tenth implementation of the video coding apparatus according to the first aspect as such or according to any of the preceding implementations of the first aspect, the 1D transformation is a Hadamard transform.

In an eleventh implementation of the video coding apparatus of the second aspect, the adaptive_filtering_flag flag is used to indicate that the mixed-domain filtering unit should be used to filter a frame, the frame_level_usage_flag flag is used to indicate that the entire reconstructed frame should be filtered, the macroblock_size field is used to indicate a macroblock size which should be used for filtering, and/or the use_filtered_mb_flag flag is used to indicate whether a filtered macroblock should be used.

A second aspect of the invention refers to a system comprising a video encoding apparatus according to one of the previous claims and a video decoding apparatus according to one of the previous claims, wherein the parameter determination unit of the video encoding apparatus is configured to determine the filter parameters in the same way as the parameter determination unit of the video decoding apparatus.

This system has the advantage that no transmission of filtering parameters from the encoder side to the decoder side is required.

A third aspect of the invention refers to a method for encoding or decoding a frame of a video, the method comprising:

reconstructing the frame of the video, and jointly determining one or more filter parameters and filtering in a pixel domain and a frequency domain a block of the reconstructed frame based on the determined filter parameters to obtain a filtered block of the frame, wherein the one or more filter parameters are based on one or more first parameters which are based on the reconstructed frame and one or more second parameters which are based on codec signaling information.

The methods according to the third aspect of the invention can be performed by the video coding apparatus according to the first aspect of the invention. Further features or implementations of the method according to the third aspect of the invention can perform the functionality of the video coding apparatus according to the first aspect of the invention and its different implementation forms.

A fourth aspect of the invention refers to a computer-readable storage medium storing program code, the program code comprising instructions for carrying out the method of the third aspect.

BRIEF DESCRIPTION OF THE DRAWINGS

To illustrate the technical features of embodiments of the present invention more clearly, the accompanying drawings provided for describing the embodiments are introduced briefly in the following. The accompanying drawings in the following description are merely some embodiments of the present invention, modifications on these embodiments are possible without departing from the scope of the present invention as defined in the claims.

DETAILED DESCRIPTION OF THE EMBODIMENTS

Figure 1:
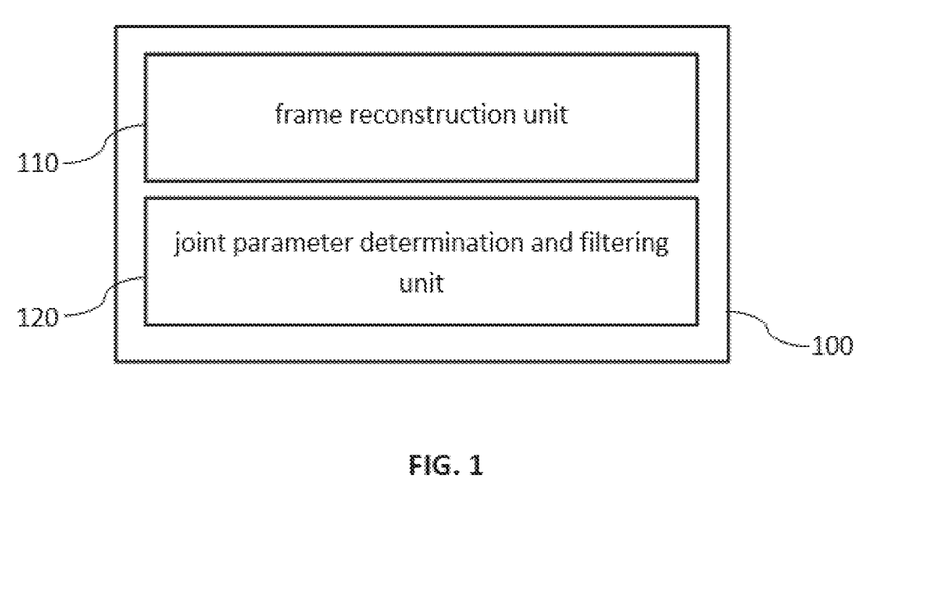
FIG. 1 is a block diagram illustrating a video coding apparatus in accordance with an embodiment of the present invention.

FIG. 1 shows a video coding apparatus 100 for encoding or decoding a frame of a video.

The video coding apparatus comprises a frame reconstruction unit 110, a joint parameter determination and filtering unit 120.

The reconstruction unit 110 is configured to reconstruct the frame.

The joint parameter determination and filtering unit 120 is configured to determine one or more filter parameters and to filter in a frequency domain and a pixel domain a block of the reconstructed frame based on the determined filter parameters to obtain a filtered block of the frame, wherein determining the one or more filter parameters and filtering in a frequency domain based on the determined filter parameters is performed jointly within a loop, and wherein the one or more filter parameters are based on one or more first parameters which are based on the reconstructed frame and one or more second parameters which are based on codec signaling information.

Figure 2:
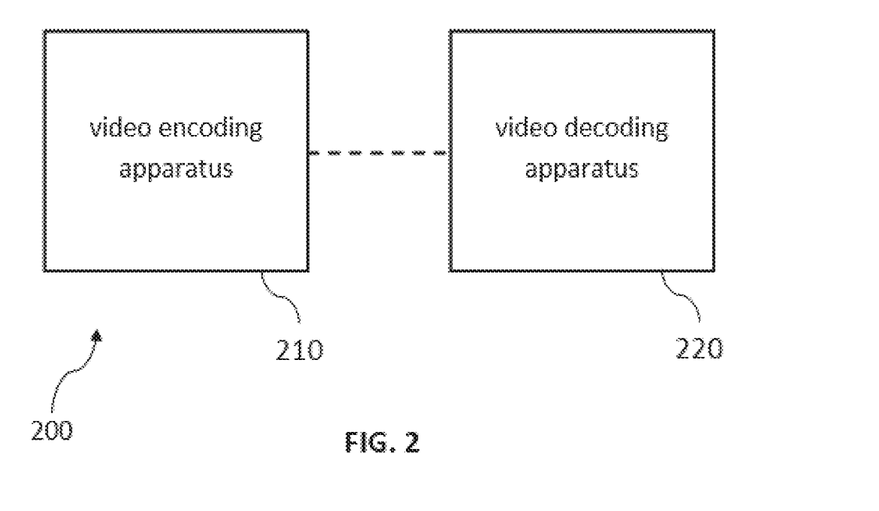
FIG. 2 is a block diagram illustrating a system comprising a video encoding apparatus and a video decoding apparatus in accordance with a further embodiment of the present invention.

FIG. 2 shows a system 200 comprising a video encoding apparatus, e.g. configured as shown in FIG. 1, and a video decoding apparatus, e.g. configured as shown in FIG. 1. The parameter determination unit of the video encoding apparatus 210 is configured to determine the filter parameters in the same way as the parameter determination unit 220 of the video decoding apparatus.

Figure 3:
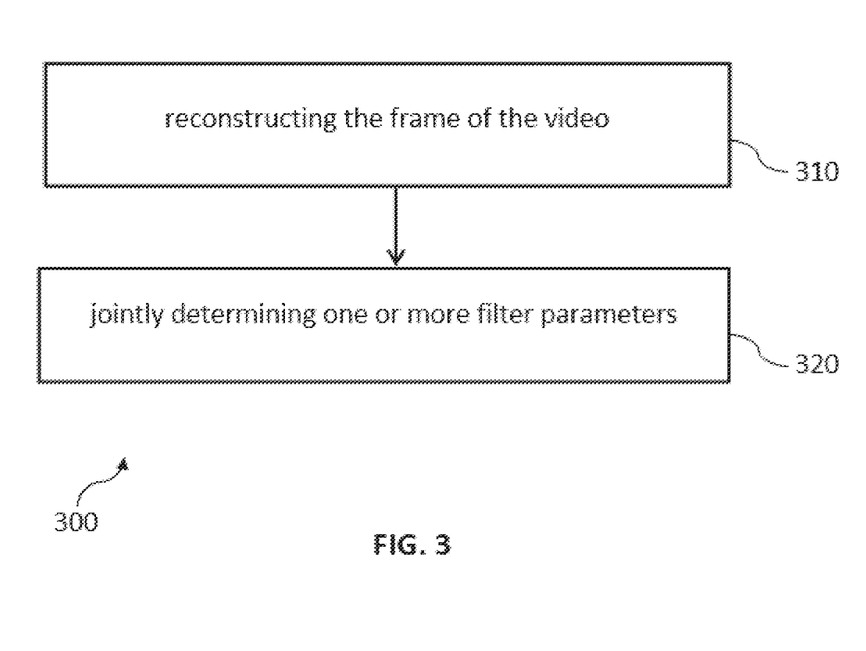
FIG. 3 is a flow chart of a method for encoding or decoding a frame of a video in accordance with a further embodiment of the present invention.

FIG. 3 shows a method 300 for encoding or decoding a frame of a video.

The method comprises a first step 310 of reconstructing the frame of the video.

The method comprises a second step 320 of jointly determining one or more filter parameters and filtering in a pixel domain and a frequency domain a block of the reconstructed frame based on the determined filter parameters to obtain a filtered block of the frame, wherein the one or more filter parameters are based on one or more first parameters which are based on the reconstructed frame and one or more second parameters which are based on codec signaling information.

The reconstructed (decoded) frame can be divided into a set of small macroblocks and then each macroblock can be filtered by a filter as described herein.

Figure 4:
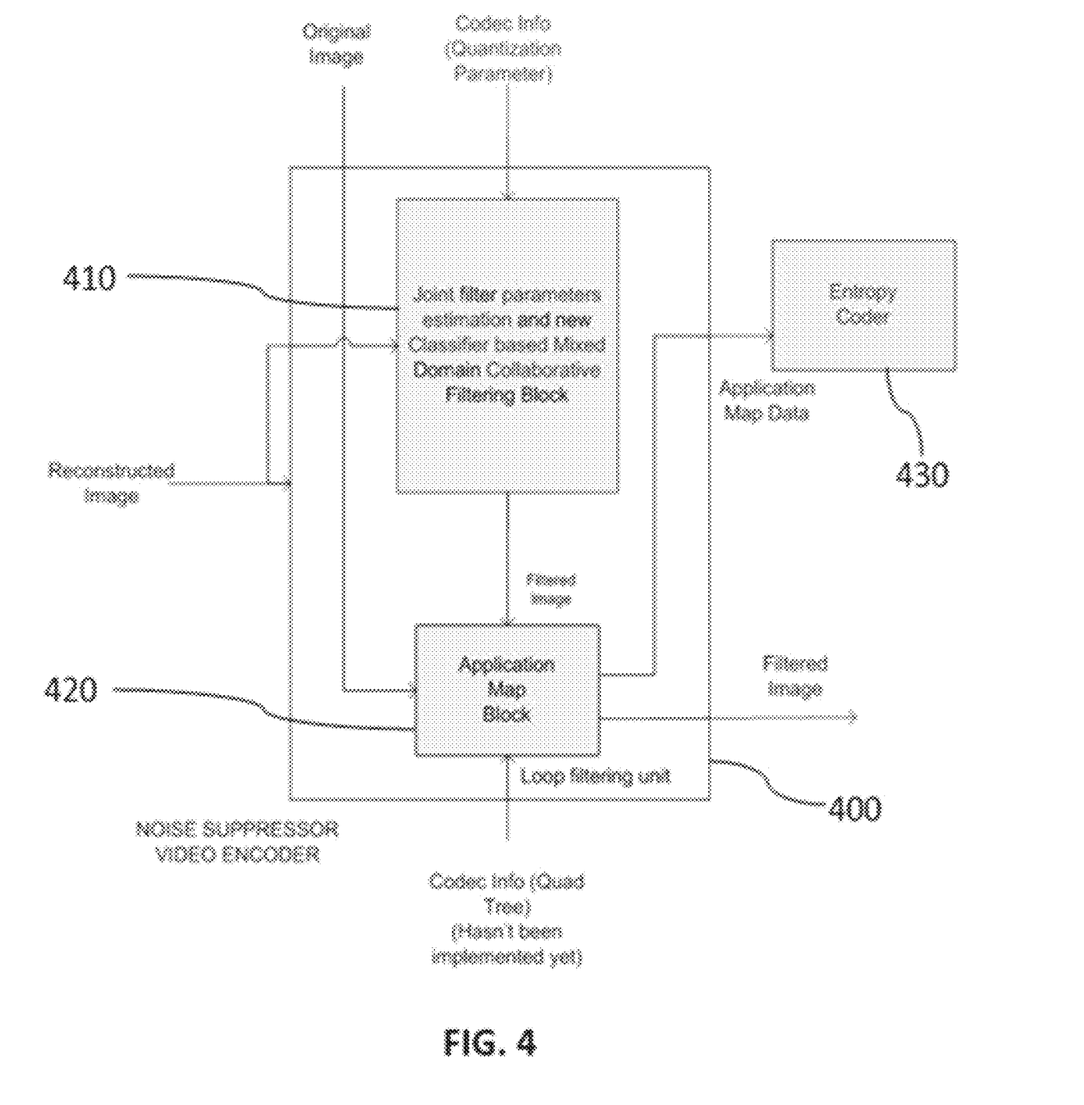
FIG. 4 is a block diagram of a loop filter in accordance with a further embodiment of the present invention.

FIG. 4 shows a block diagram of a loop filter 400.

The loop filter 400 comprises two blocks: A joint filter parameter estimation and classifier based mixed domain collaborative filtering block 410 and an application map block 420. The joint filter parameter estimation and classifier based mixed domain collaborative filtering block 410 is a joint parameter determination and filtering unit.

In contrast to ALF, base filtering is performed by a Wiener filter in frequency domain. Filter parameter estimation is performed in frequency domain too. Similar methods are used for filter parameter estimation and filtering, so in proposed design filtering and filter parameter estimation are combined in one procedure. This allows to significantly decrease the complexity of the procedure.

Similar to ALF, the filter parameter estimator calculates filter parameters. But in contrast to an ALF filter, the filter parameters can be calculated without knowledge of the source images.

Filter parameter estimation is based on two groups of input parameters. The first group of parameters is estimated based on the reconstructed frame and the second group of parameters is derived from service codec parameters which are already transferred from the encoder to the decoder in the general hybrid video codec. According to this procedure, the filter parameters can be estimated on the decoder side and thus filter parameters do not need to be transferred from the encoder to the decoder side. In ALF, the parameter estimation block calculates the pixel domain impulse response, but in the design of FIG. 4, the block 410 estimates the frequency impulse response, because base filtering is performed in frequency domain. Frequency domain implementation allows building a more efficient non-linear frequency domain filter.

In contrast to ALF, which performs local filtering in pixel domain, in the loop filter 400 of FIG. 4, non-local collaborative filtering is performed in a mixed domain (spatial frequency domain and pixel domain). Such approach allows more efficient usage of spatial redundancy. Initial filtering can be performed in frequency domain and the final averaging in pixel domain.

The loop filter 400 of FIG. 4 does not require matching between filtered and original videos for filter parameter estimation and so the filter can suppress input sensor noise and improve prediction quality. Input sensor noise is a useful signal for the end user and so an application map block during RDO process determines areas where filtering should be applied. If coding gain from prediction improvement and quantization noise removing from decoded video is significantly more than filtered decoded image degradation then filtering is applied. Otherwise, the reconstructed video is used for prediction and as output for an end user.

The application map block decision is preferably not a single method for control fields where filtering should be turned on/off. The classifier based filtering approach allows to predict fields were filtering should be prohibited and simplified. It allows to save bit budget for application map transmission and to simplify the encoder and the decoder.

Figure 5:
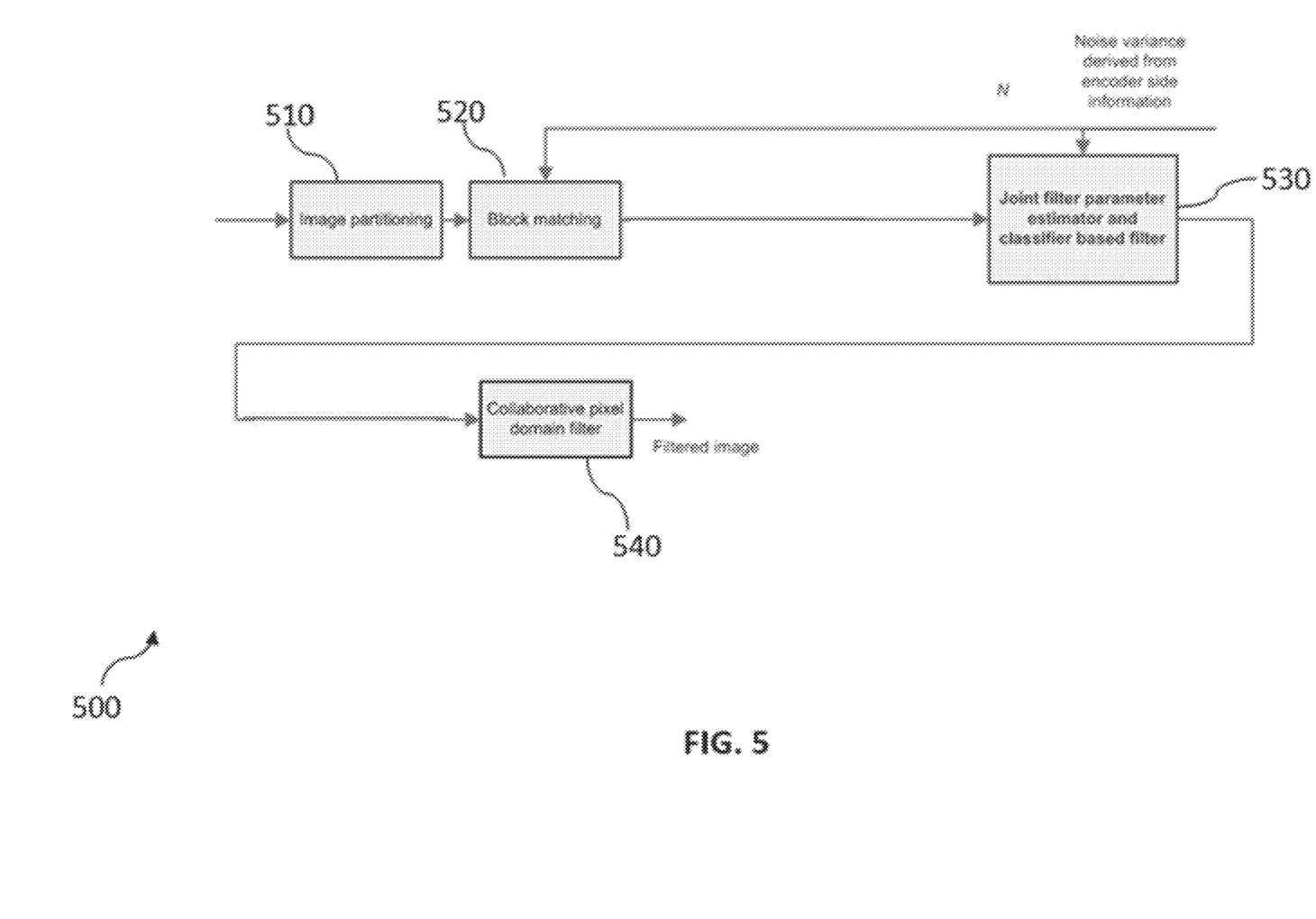
FIG. 5 is a block diagram of a joint parameter determination and filtering unit in accordance with a further embodiment of the present invention.

FIG. 5 is a block diagram of a joint parameter determination and filtering unit 500. The joint parameter determination and filtering unit 500 comprises an image partitioning unit 510, a block matching unit 520, a joint filter parameters estimator and classifier based filter 530 and a collaborative pixel domain filter 540.

The image partitioning unit 510 generates a set of macroblocks which covers the reconstructed frame. Then, for each macroblock from this set the block matching unit 520 finds k closest blocks using an MSE metric. Found patches are grouped to a cluster. Then, in the joint filter parameter estimator and classifier based filter 530, simultaneously reconstructed frame filtering and filter parameter estimation are performed in frequency domain for each pixel cluster. On the last stage of processing filtered in frequency domain clusters are averaged in pixel domain by the collaborative pixel domain filter 540.

Figure 6:
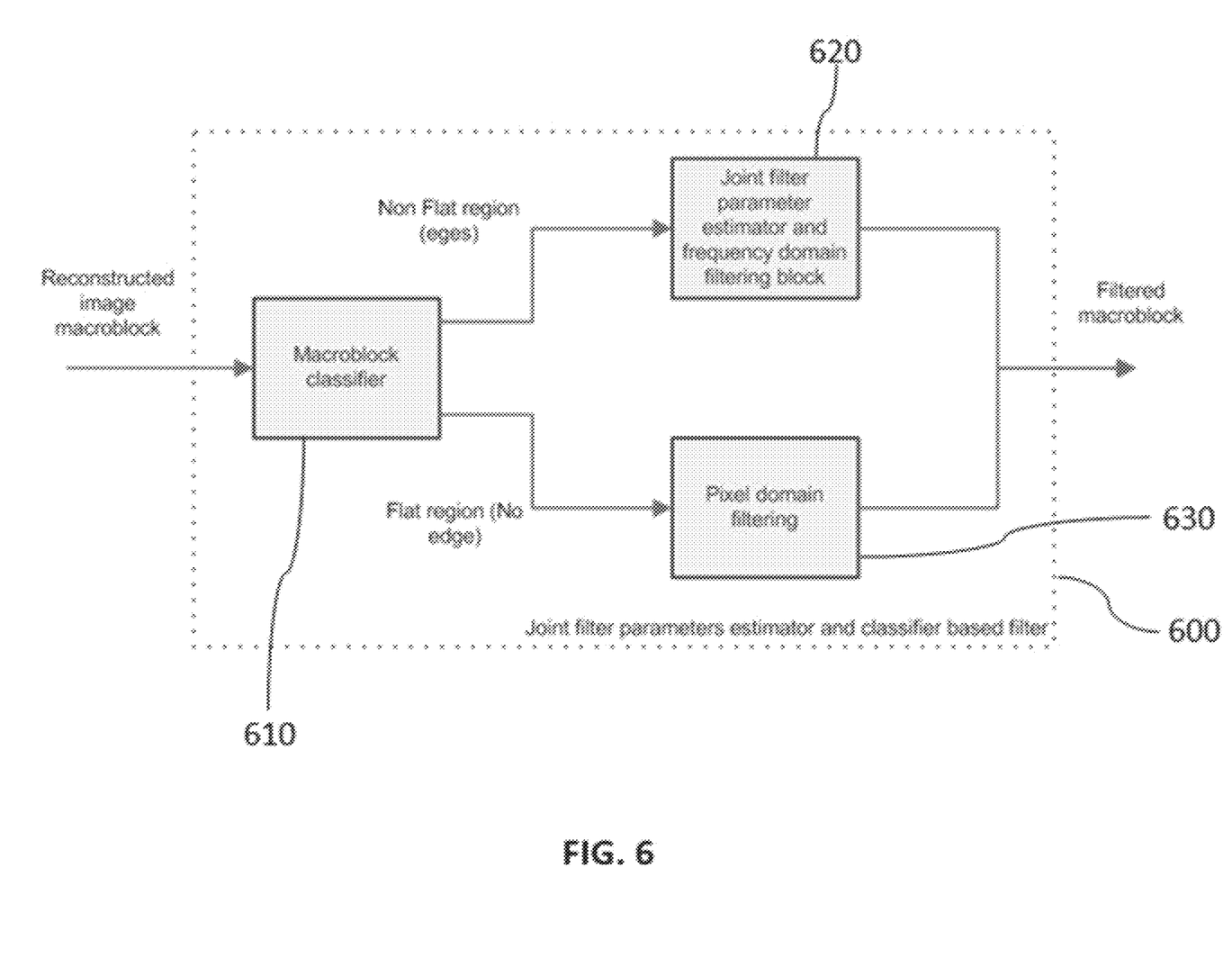
FIG. 6 is a block diagram illustrates operation of a joint filter parameters estimator and classifier based filter in accordance with a further embodiment of the present invention.

FIG. 6 is a block diagram that illustrates operation of joint a filter parameters estimator and classifier based filter 600 which comprises a macroblock classifier 610, a joint filter parameter estimator and frequency domain filtering block 620 and a pixel-domain filtering block 630. According to this figure, for each macroblock from the reconstructed (decoded) frame the macroblock classifier 610 makes a decision about image flatness (smoothness) inside the macroblock. If the macroblock is considered flat (without edges), then local filtering is performed in pixel domain using the pixel-domain filtering block 630. Otherwise, non-local collaborative filtering along edges is performed in frequency domain using the joint filter parameter estimator and frequency domain filtering block 620.

Figure 7:
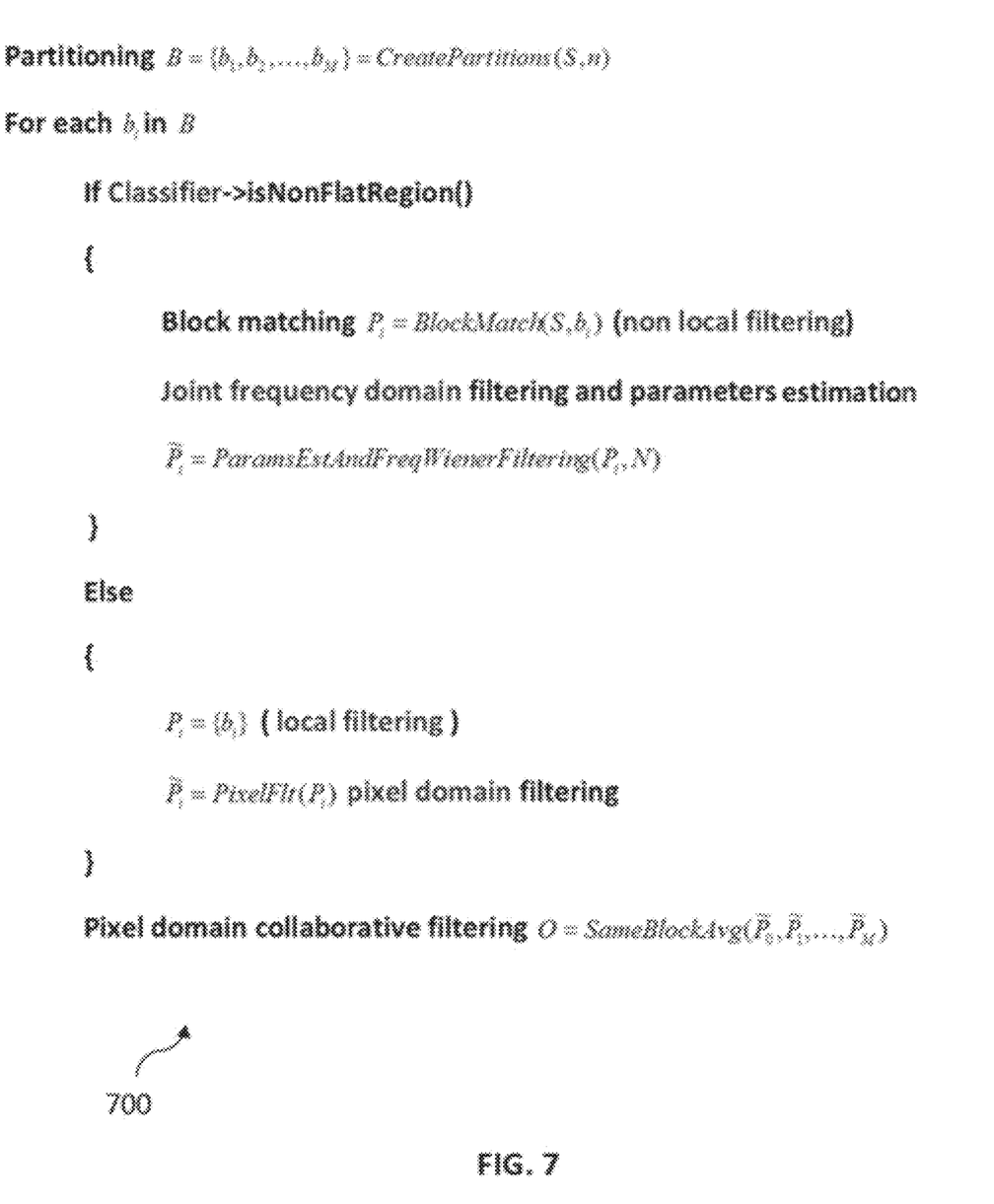
FIG. 7 shows pseudo-code that illustrates an example implementation of the joint filter parameters estimator and classifier based filter of the method of FIG. 6.

FIG. 7 shows pseudo-code that illustrates the above process in detail. In a first processing step, a partitioning procedure creates a macroblocks set $B=\{b_1, b_2, \ldots, b_M\}$ which covers a reconstructed (decoded) frame, where M is a number of macroblocks and $b_i$ is an i-th reference macroblock. Then, for each macroblock $b_i$ the classifier makes a decision about region smoothness. If the region is classified as flat, then only local filtering is performed in pixel domain: $\tilde{P}_i$=PixelFlt($b_i$). Otherwise, non-local collaborative filtering is performed in frequency domain (filtering along the edges).

If a reference macroblock $b_i$ is classified as region with edges, then k closest blocks are found using a MSE metric during a block matching procedure $P_i$=BlockMatch(S,$b_i$)={$b_i$, $p_i^0$, $p_i^1$, $p_i^2$, ..., $p_i^{k-1}$}, where S is the reconstructed frame and $p_i^j$ is the patch corresponding to reference macroblock $b_i$. Then, joint filter parameter estimation and collaborative Wiener filtering in frequency domain are performed over pixel cluster $P_i$: $\tilde{P}_i$=ParamsEstAndFreqWienerFiltering($P_i$,N).

On the last processing stage filtered pixel clusters are averaged during a SameBlockAvg( ) procedure, which is described below.

Figure 8:
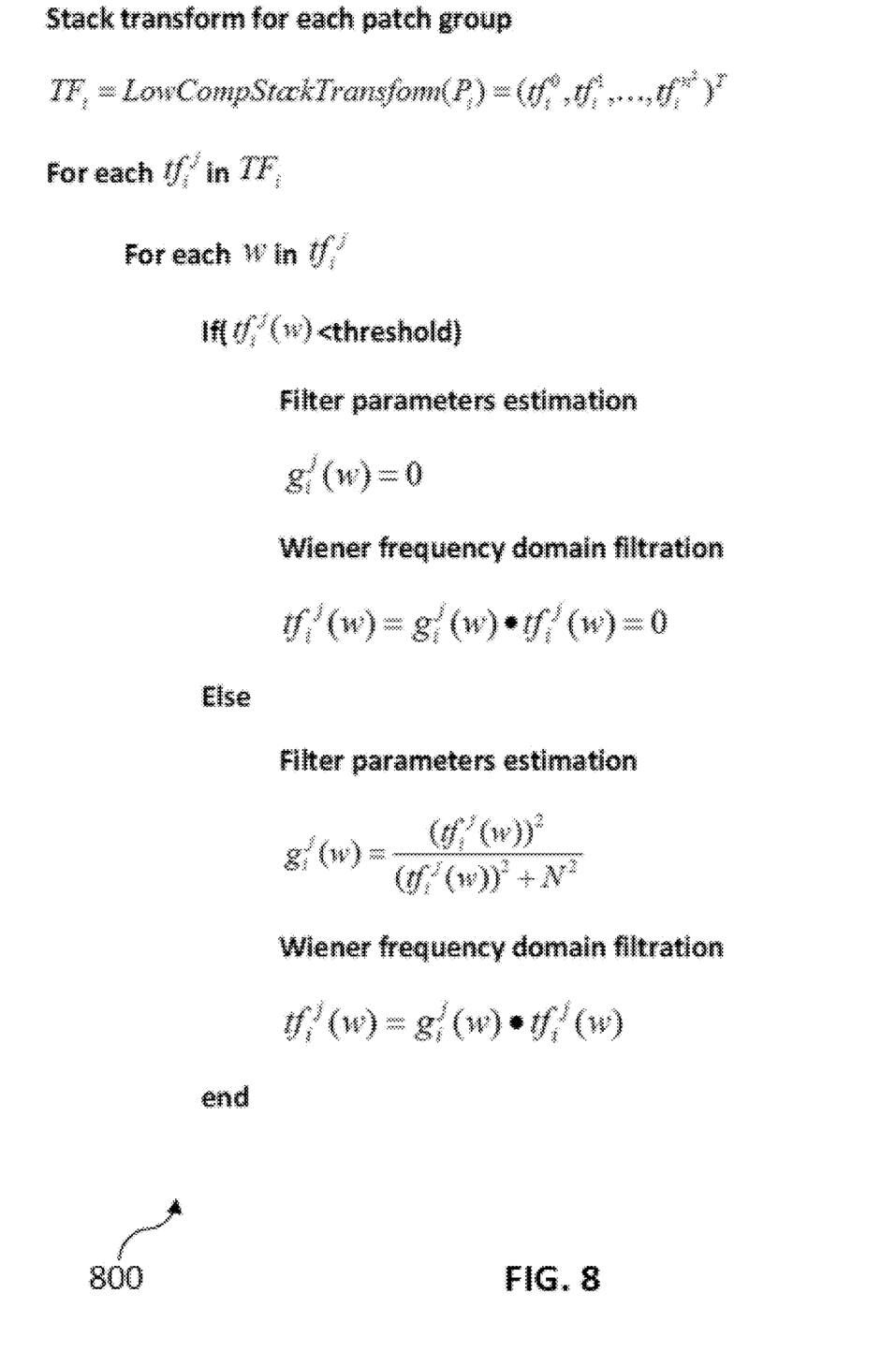
FIG. 8 shows pseudo-code for a joint collaborative Wiener filtering and parameter estimation procedure in accordance with a further embodiment of the present invention.

FIG. 8 shows pseudo code for a joint collaborative Wiener filtering and parameter estimation procedure ParamsEstAndFreqWienerFiltering( ). According to this procedure collaborative Wiener filtering is performed in frequency domain and a frequency impulse response is used as filtering parameter. Similar methods are used for filter parameter estimation and filtering, so filtering and filter parameter estimation are combined in one procedure. In the first step of the procedure stack the (group) transform Low CompStackTransform( ) is performed over a pixel patches cluster. For this target 1D transforms are performed over pixels from different patches of one cluster with the same spatial displacement inside patch. In result of this process a 2D spectral matrix is filled:

$$TF_i=\text{LowCompStackTransform}(P_i)$$

Each string of this matrix corresponds to spatial displacement inside pixel patch and column number determines frequency index of 1D transform. On the next processing step for each row of matrix $TF_i$ and for each frequency of 1D transform Wiener filter spectral coefficient gain is estimated according to following equation:

$$g_i^j(w) = \frac{(tf_i^j(w))^2}{(tf_i^j(w))^2 + N^2}$$

If a spectral component from matrix $TF_i$ is less than a threshold, e.g. a predetermined threshold, then a corresponding coefficient of the Wiener filter frequency response is set to zero.

In the same cycle Wiener frequency domain filtering is performed via multiplication of a spectrum component from matrix $TF_i$ by a corresponding coefficient of the Wiener filter frequency response:

$$\tilde{tf}_i^j(w)=g_i^j(w)\cdot tf_i^j(w)$$

Figure 9:
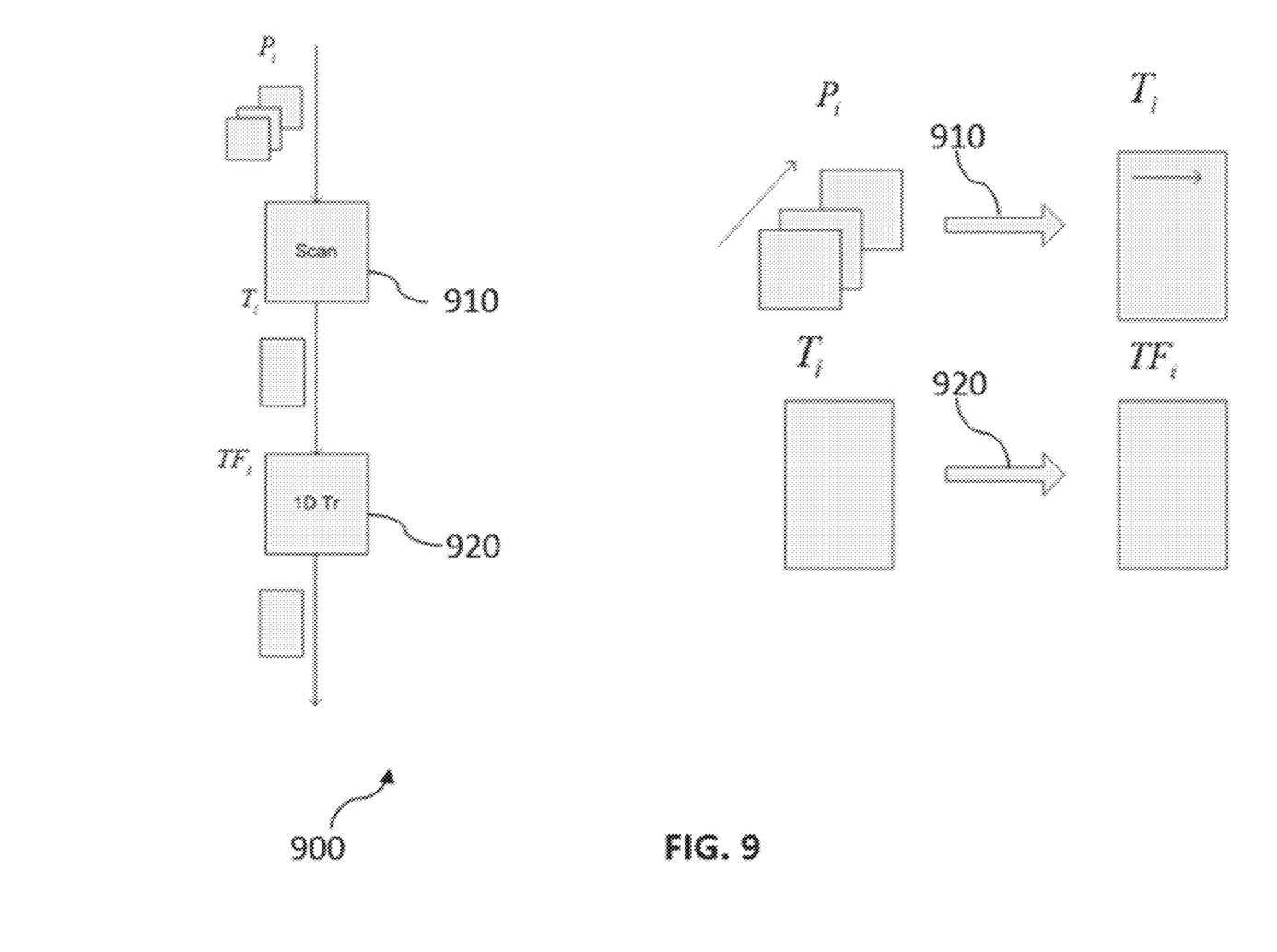
FIG. 9 is a schematic illustration of a LowCompStackTransform( ) procedure in accordance with a further embodiment of the present invention.

FIG. 9 is a schematic illustration of a LowCompStackTransform( ) procedure. The LowCompStackTransform( ) procedure is performed in two steps. In a first step an auxiliary matrix $T_i$ is created based on pixel domain cluster $P_i$ scanning 910.

The following scanning rule is used: each row of matrix $T_i$ comprises pixels from different patches of the same pixel domain cluster $P_i$ with the same spatial displacements (offsets) [x, y]:

$$T_i = \begin{pmatrix} t_1 \\ t_2 \\ \ldots \\ t_{n \times n} \end{pmatrix},$$

$t_j = (p_i^0[x, y], p_i^1[x, y], \ldots, p_i^{k-1}[x, y]),$ $x = 0, \ldots, n-1;$ $y = 0, \ldots, n-1;$ $j = x \cdot n + y$ On the last step of LowCompStackTransform( ) procedure the output matrix $TF_i$ is created. Each row of this matrix is a 1D transform 920 of a corresponding row of the $T_i$ matrix.

Figure 10:
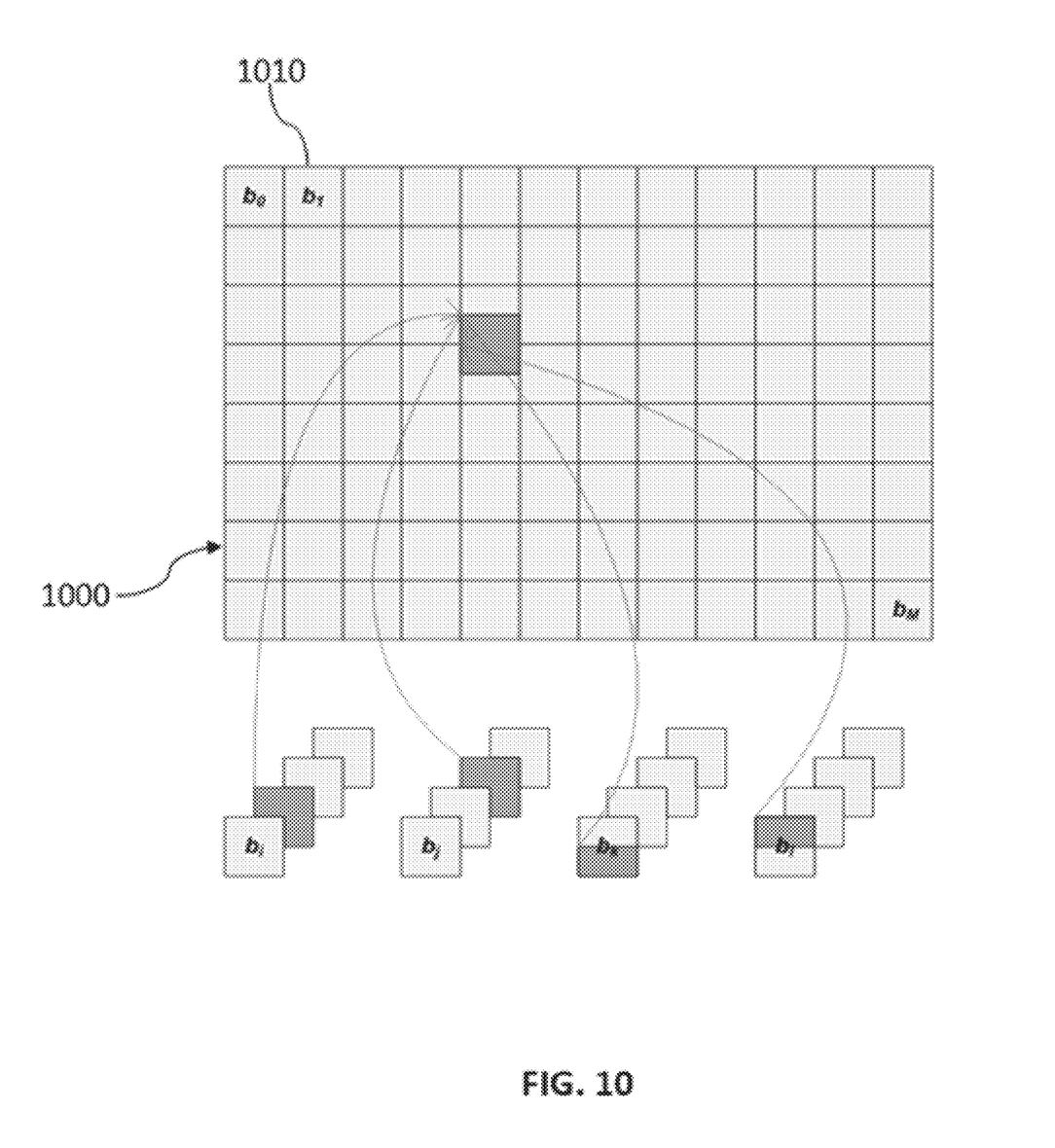
FIG. 10 is a schematic illustration of a pixel domain collaborative filter in accordance with a further embodiment of the present invention.

FIG. 10 is a schematic illustration of a pixel domain collaborative filter (procedure SameBlockAvg( )). Filtering is based on the result of collaborative filtering in frequency domain. After collaborative filtering in frequency domain for each reference macroblock 1010 from the reconstructed frame 1000 there is set of filtered similar blocks which can be used for noise averaging. If we perform averaging along spatial patches we can decrease noise from one side, but also we will distort edges from other side. So averaging is performed different way. Each macroblock in the reconstructed frame can be reference for one pixel patches cluster and secondary for other pixel clusters. In each cluster averaging is performed independently and so the same patch can be filtered in different cluster in different ways. A collaborative filter in pixel domain averages the same patch (patch with fixed spatial coordinates) along all clusters which include this patch. This allows to decrease noise and to introduce low edge distortion, As mentioned above, the presented filter can suppress not only quantization noise, but also input sensor noise because filter parameters are estimated without matching to original signal. However, sensor noise is often considered a useful signal for the end user, so benefit from prediction signal improvement/noise suppression and decoded signal distortion should be balanced. An application map unit can perform this balancing.

Figure 11:
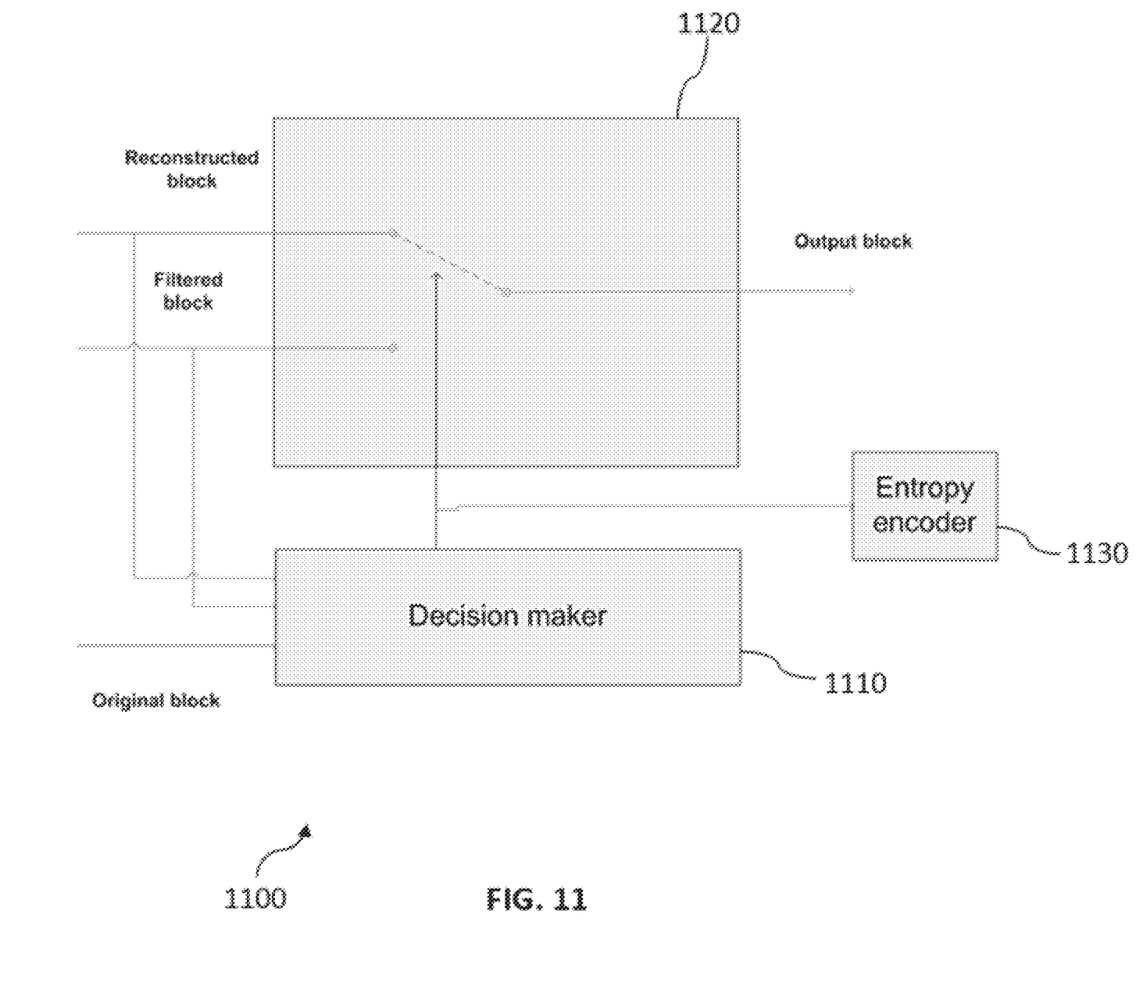
FIG. 11 is a block diagram of an application map unit in accordance with a further embodiment of the present invention.

FIG. 11 shows a block diagram which illustrates operation of an application map unit 1100, which is an application map unit. The application map unit 1100 determines where the re-constructed image should be filtered and where the original reconstructed frame should be used for delivery for an end user. A block generation unit (not shown) generates a set of macroblocks which covers the reconstructed frame. Then, for each macroblock the decision maker block 1110 makes a decision about filter usage for the chosen macroblock during a rate distortion optimization (RDO) process. Correspondingly, a switch 1120 chooses an output block to be either the reconstructed block or the filtered block.

If a coding gain from removing quantization noise from the decoded image is significantly more than degradation of the filtered decoded image, then filtering is applied. Otherwise, a reconstructed image is used as output for an end user. The application map block decisions are encoded with an entropy encoder 1430 and transferred from the encoder side to the decoder side.

Further embodiments of the present invention may include:

1. A method and an apparatus for predictive coding a video stream of subsequent frames into an encoded video bit stream, comprising:
   reconstructing video frames corresponding to coded video data
   Wiener adaptive loop filter in mixed domain (spatial frequency and pixel domain) applied to reconstructing video frame for post (decoded signal improvement) and in-loop (prediction improvement) filtering, where part of filter parameters is estimated from reconstructed video signal and second part of filter parameters is derived from encoder signaling information which is already encoded into bitstream and using for encoded signal reconstruction in codec's without adaptive loop filter
   classifier determining fields where reconstructed frame should be filtered
   filter parameter estimator in frequency domain merged with Wiener adaptive loop filter in mixed domain
2. Same as previous, where any frame from Decoded Picture Buffer can be used for filter parameter estimation.
3. Same as previous, where both part of adaptive loop filter parameters can be derived on the decoder side and so should not be encoded into bitstream.
4. Same as previous, where filter parameter estimation is based on original image estimation from reconstructed signal and quantization noise estimation.
5. Same as previous, where original image estimation based on reconstructed image only
6. Same as previous, where noise estimation is function from encoder quantization parameter (QP)
7. Same as previous, where classifier determines where local and where non-local filtering should be performed
8. Same as previous, where classifier determines where filtering should be turned on/off
9. Same as previous, where a classifier decision is based on luma variance in chosen reconstructed frame field
10. Same as previous, where application map is implemented on the filter output for optimal trade-off between sensor & quantization noise suppression and decoded video degradation for fields where classifier made decision about non-local filtering.
11. Same as previous, where Wiener collaborative adaptive loop filter in mixed domain consist of the following steps:
    Generation set of blocks covered reconstructed image
    Spatial search of patches similar to reference block selected on the first stage
    Grouping found patches to clusters
    Wiener collaborative filtering in frequency domain of 2D pixels patches corresponding to one cluster
    Pixel domain averaging pixel patches which were filtered in frequency domain with the same spatial coordinates from different patches clusters
12. Same as previous, where 1D transform is used for Wiener frequency domain filtering of pixel from different patches of one cluster with the same spatial displacement inside patch
13. Same as previous, where 1D Hadamard transform is used for Wiener frequency domain filtering of pixel from different patches of one cluster with the same spatial displacement inside patch
14. Same as previous, where Wiener filter frequency impulse response is used as filter parameter.
15. Same as previous, where Wiener filter frequency impulse response estimation consist of the following steps:
    Generation set of blocks covered reconstructed image
    Spatial search of patches similar to reference block selected on the first stage
    Grouping found patches to clusters
    1D transform of pixels from different patches of one cluster with the same spatial displacement inside patch
    Wiener frequency impulse response calculation as function from spectrum component value and noise variance
16. Same as previous, where 1D Hadamard transform is used for Wiener frequency impulse response estimation.
17. Same as previous, where Wiener filter frequency impulse response estimation is merged with Wiener frequency domain filtering in one procedure
18. Same as previous, where generation set of block covered reconstructed frame, spatial search of patches similar to reference block selected on first stage, grouping found patches to cluster, forward 1D transform of pixels from different patches of one cluster with the same spatial displacement inside patch is performed only one time
19. Same as previous, where adaptive_filtering_flag flag is used for event signaling when proposed compression tool should be used
20. Same as previous, where frame_level_usage_flag flag is used for signaling case when whole reconstructed frame should be filtered
21. Same as previous, where macroblock_size determines macroblock size which should be used for filtering
22. Same as previous, where use_filtered_mb_flag flag shows whether filtered macroblock should be used The foregoing descriptions are only implementation manners of the present invention, the scope of the present invention is not limited to this. Any variations or replacements can be easily made through person skilled in the art. Therefore, the protection scope of the present invention should be subject to the protection scope of the attached claims.

What is claimed is:

1. A video coding apparatus for encoding or decoding a frame of a video, the video coding apparatus comprising a processor and a non-transitory storage medium carrying a program code, wherein the program code, when executed by the processor facilitates performing a programmed processor-implemented method comprising:
   reconstructing the frame to render a reconstructed frame;
   determining a set of filter parameters; and
   filtering, in a frequency domain and a pixel domain, a block of the reconstructed frame based on the set of filter parameters to obtain a filtered block of the frame,
   wherein the filtering a block of the reconstructed frame comprises performing, for the block of the reconstructed frame:
      determining a group of pixel-domain patches that are similar to the block,
      determining first parameters based on the group of pixel-domain patches,
      determining second parameters based on signaling information of the block,
      performing collaborative filtering of the group of pixel-domain patches in the frequency domain to obtain a group of filtered pixel-domain patches, and
      performing collaborative filtering of the filtered pixel-domain patches in pixel domain along pixel-domain patches with same spatial coordinates from different groups.

2. The video coding apparatus of claim 1, wherein the programmed processor-implemented method further comprises:
 determining for the block, by carrying out a classifying operation, whether to filter the block:
  by carrying out determination a first filtering operation, wherein the first filtering operation comprises the filtering the block of the frame in the frequency domain and the pixel domain, or
  by carrying out a second filtering operation, wherein the second filtering operation comprises filtering the block of the frame in the pixel domain.

3. The video coding apparatus of claim 2, wherein the classifying operation comprises determining to filter the block by carrying out the first filtering operation based on one or more of the group consisting of:
 a smoothness measure being lower than a threshold, and
 a luma variance being lower than a threshold.

4. The video coding apparatus of claim 2, wherein the video coding apparatus is an encoder, and wherein the programmed processor-implemented method further comprises:
 determining, for a joint-filtering block for which the classifying operation has determined to filter using the first filtering operation, whether to skip the filtering.

5. The video coding apparatus of claim 1, wherein the filtering operation comprises:
 obtaining a matrix $T_i$, wherein each row of the matrix $T_i$ comprises a plurality of pixels, wherein the pixels are determined based on a position of the block,
 transforming the matrix $T_i$ to obtain a transformed matrix $tf_{vw}^i$, wherein each row of the matrix $tf_{vw}^i$ is a one-dimensional transform of a corresponding row of the matrix $T_i$, and
 performing filtering by multiplying each element of the transformed matrix $tf_{vw}^i$ by a corresponding filter parameter of the set of filter parameters, and
 wherein the filter parameters $g_{v,w}^i$ is determined as:

$$g_{vw}^i(\Omega) = \frac{(tf_{vw}^i(\Omega))^2}{(tf_{vw}^i(\Omega))^2 + N^2}$$

wherein $\Omega$ is a column number in matrix $tf_{vw}^i$ spatial coordinates v, w correspond to a j-th row of matrix $tf_{vw}^i$, and N is a quantization noise value derived from quantization parameters for the block obtained from codec signaling information.

6. The video coding apparatus of claim 5, wherein the performing filtering by multiplying each element of the transformed matrix $tf_{vw}^i$, by a corresponding filter parameter of the set of filter parameters comprises: performing filtering by multiplying each element of the matrix $tf_{vw}^i$ by a filter parameter $g(\Omega)_{vw}^i$, where:
 $\Omega$ is a column number in the matrix $tf_{vw}^i$, and
 spatial coordinates v, w in each patch correspond to a j-th row of the matrix $tf_{vw}^i$.

7. The video coding apparatus of claim 5, wherein the one-dimensional transformation is a Hadamard transform.

8. The video coding apparatus of claim 5, wherein the set of filter parameters is based on:
 transformed pixel values that are obtained by Hadamard transforming the pixels into the frequency domain.

9. The video coding apparatus of claim 1, further comprising one or more of the group consisting of:
 the adaptive_filtering_flag flag indicates that the mixed-domain filtering unit should be used to filter a frame,
 the frame_level_usage_flag flag indicates that the entire reconstructed frame should be filtered,
 the macroblock_size field indicates a macroblock size which should be used for filtering, and
 the use_filtered_mb_flag flag indicates whether a filtered macroblock should be used.

10. The video coding apparatus of claim 1, wherein the set of filter parameters for individually performing one of either a frequency domain filtering operation or a pixel domain filtering operation during the filtering is determined based on:
 transformed pixel values that are obtained by transforming pixels in the pixel domain into the frequency domain, wherein the pixels are determined based on a position of the block, and
 quantization parameters for the block obtained from a codec signaling information.

11. A system comprising:
 a video encoding apparatus for encoding a frame of a video; and
 a video decoding apparatus for decoding a frame of a video,
 wherein the system comprises a processor and a non-transitory storage medium carrying a program code,
 wherein the program code, when executed by the processor, causes the system to carry out a programmed processor-implemented method comprising:
  reconstructing the frame to render a reconstructed frame;
  determining a set of filter parameters; and
  filtering, in a frequency domain and a pixel domain, a block of the reconstructed frame based on the set of filter parameters to obtain a filtered block of the frame,
 wherein the video encoding apparatus is configured to determine the set of filter parameters, during the determining, in a same way as the video decoding apparatus, and
 wherein the filtering a block of the reconstructed frame comprises performing, for the block of the reconstructed frame:
  determining a group of pixel-domain patches that are similar to the block,
  determining first parameters based on the group of pixel-domain patches,
  determining second parameters based on signaling information of the block,
  performing collaborative filtering of the group of pixel-domain patches in the frequency domain to obtain a group of filtered pixel-domain patches, and
  performing collaborative filtering of the filtered pixel-domain patches in pixel domain along pixel-domain patches with same spatial coordinates from different groups.

12. The system of claim 11, wherein the set of filter parameters for individually performing one of either a frequency domain filtering operation or a pixel domain filtering operation during the filtering is determined based on:
 transformed pixel values that are obtained by transforming pixels in the pixel domain into the frequency domain, wherein the pixels are determined based on a position of the block, and quantization parameters for the block obtained from a codec signaling information.

13. A non-transitory computer-readable medium comprising computer-executable instructions, wherein the computer-executable instructions, when executed by a computer, cause the computer to carry out a method for encoding or decoding a frame of a video, the method comprising:
reconstructing the frame of the video to render a reconstructed frame;
determining a set of filter parameters; and
filtering, in a pixel domain and a frequency domain, a block of the reconstructed frame based on the determined set of filter parameters to obtain a filtered block of the frame,
wherein the filtering a block of the reconstructed frame comprises performing, for the block of the reconstructed frame:
determining a group of pixel-domain patches that are similar to the block,
determining first parameters based on the group of pixel-domain patches,
determining second parameters based on signaling information of the block,
performing collaborative filtering of the group of pixel-domain patches in the frequency domain to obtain a group of filtered pixel-domain patches, and
performing collaborative filtering of the filtered pixel-domain patches in pixel domain along pixel-domain patches with same spatial coordinates from different groups.

14. The non-transitory computer-readable medium of claim 13, wherein the set of filter parameters for individually performing one of either a frequency domain filtering operation or a pixel domain filtering operation during the filtering is determined based on:
transformed pixel values that are obtained by transforming pixels in the pixel domain into the frequency domain, wherein the pixels are determined based on a position of the block, and
quantization parameters for the block obtained from a codec signaling information.

15. A method for encoding or decoding a frame of a video, the method comprising:
reconstructing the frame of the video to render a reconstructed frame;
determining a set of one or more filter parameters; and
filtering, in a pixel domain and a frequency domain, a block of the reconstructed frame based on the determined set of filter parameters to obtain a filtered block of the frame,
wherein the filtering a block of the reconstructed frame comprises performing, for the block of the reconstructed frame:
determining a group of pixel-domain patches that are similar to the block,
determining first parameters based on the group of pixel-domain patches,
determining second parameters based on signaling information of the block,
performing collaborative filtering of the group of pixel-domain patches in the frequency domain to obtain a group of filtered pixel-domain patches, and
performing collaborative filtering of the filtered pixel-domain patches in pixel domain along pixel-domain patches with same spatial coordinates from different groups.

16. The method of claim 15, wherein the set of filter parameters for individually performing one of either a frequency domain filtering operation or a pixel domain filtering operation during the filtering is determined based on:
transformed pixel values that are obtained by transforming pixels in the pixel domain into the frequency domain, wherein the pixels are determined based on a position of the block, and
quantization parameters for the block obtained from a codec signaling information.

\* \* \* \* \*

UNITED STATES PATENT AND TRADEMARK OFFICE
CERTIFICATE OF CORRECTION

PATENT NO. : 11,240,496 B2
APPLICATION NO. : 16/422428
DATED : February 1, 2022
INVENTOR(S) : Stepin et al.

It is certified that error appears in the above-identified patent and that said Letters Patent is hereby corrected as shown below:

On the Title Page

Page 2, item [56], Line 4: "Zhang et al., "Image postprocessing by Nonlocal Kuans filter,"" should read -- Zhang et al., "Image postprocessing by Nonlocal Kuan's filter," --.

Page 2, item [56], Line 4: "XP028172660, Depnrtment of Electranic Engineering, The Chinese" should read -- XP028172660, Department of Electronic Engineering, The Chinese --.

Signed and Sealed this
Twenty-ninth Day of November, 2022

Katherine Kelly Vidal
*Director of the United States Patent and Trademark Office*